United States Patent [19]
Bouis et al.

[11] Patent Number: 5,365,782
[45] Date of Patent: Nov. 22, 1994

[54] HANDLING ROOM FOR WIND-TUNNEL CRYOGENIC MODELS

[75] Inventors: Xavier Bouis, Koeln-Porz; John Tizard, Bonn; Ian A. Price, Wachtberg-Villiprott, all of Germany; David Wigley, Southampton, United Kingdom; Dieter Schimanski, Lohmar, Germany

[73] Assignee: European Transonic Windtunnel GmbH, Cologne, Germany

[21] Appl. No.: 96,616

[22] Filed: Jul. 22, 1993

[30] Foreign Application Priority Data

Jul. 30, 1992 [DE] Germany .............................. 4225152

[51] Int. Cl.$^5$ .............................................. G01M 9/00
[52] U.S. Cl. ............................................. 73/147; 52/64
[58] Field of Search ...................... 73/147; 52/64, 79.1, 52/79.4

[56] References Cited

U.S. PATENT DOCUMENTS

| | | | |
|---|---|---|---|
| 3,492,767 | 2/1970 | Pincus | 52/79.1 |
| 5,054,295 | 10/1991 | Goulooze | 52/64 |
| 5,119,935 | 6/1992 | Stump et al. | 52/64 |
| 5,168,675 | 12/1992 | Shea, Sr. | 52/64 |

OTHER PUBLICATIONS

Hartzuiker, J. P., "The European transonic wind-tunnel ETW: A Cryogenic solution", Aeronautical Journal, Nov., 1984, pp. 379-394.

Dress, D. A. and Kilgore, R. A., "Cryogenic wind tunnel research: a globel perspective", Cryogenics 1988 vol. 28 Jan., pp. 10-21.

Agard Report No. 774, "Special Course on Advances in Cryogenic Wind Tunnel Technology," Jun. 5-9, 1989, pp. 3-1-3-12.

*Primary Examiner*—Donald D. Woodiel
*Attorney, Agent, or Firm*—Spensley Horn Jubas & Lubitz

[57] ABSTRACT

For cooling down a cryogenic model, provided for testing in a cryogenic wind tunnel, to the wind tunnel temperature and for performing mounting work and configurational changes on the cryogenic model, there is provided a working chamber which is supplied with warm air so that working personnel can enter it. The working chamber contains an insulating box, made from heat-insulating material, which has an open top and into which cold air is injected. The insulating box accommodates the cryogenic model under cold air conditions. Persons can perform manipulations on the cryogenic model while leaning over the edge of the insulating box. The cryogenic model is held on a holder which can be lifted upwardly out of the insulating box. Removal of the cryogenic model from the working chamber is possible by opening a top door.

10 Claims, 5 Drawing Sheets

HANDLING ROOM FOR WIND-TUNNEL CRYOGENIC MODELS

The invention is directed to a handling room for wind-tunnel cryogenic models in cryogenic conditions, particularly for performing mounting work and other duties on such models which are to be tested in a cryogenic wind tunnel.

BACKGROUND OF THE INVENTION

For aerodynamic testing of model airplanes and the like in low-temperature environments, use is made of cryogenic wind tunnels into which the test model is placed for subjecting it to a cold gas flow therein. After rigging such a wind-tunnel model in a normal ambient temperature and preparing it for testing in the wind tunnel, the model has to be cooled down to the test temperature prior to insertion into the wind tunnel. Performing such a cooling process in the wind tunnel would cause a considerable energy demand for generating the required cool air.

From "Aeronautical Journal", November 1984, pp. 379 to 394, it is known to place a cold model, after rigging it for testing in the wind tunnel, into a cooling chamber and to cool it down to the wind tunnel temperature. If the model, after undergoing testing in the wind tunnel, has to be changed for a further test run, the model is transferred into a quick change room wherein it is warmed up so that a person can perform work on it. This quick change room is a treatment chamber containing an atmosphere which is breathable for humans. After completion of the work on the model, the model is transported into the cooling chamber and is cooled down again to wind tunnel conditions. This system requires a separate cooling chamber in addition to the treatment chamber. The energy consumption for warming and cooling the model is considerable.

A wind tunnel system known from "Cryogenics", Vol. 28, January 1988, pp. 10 to 21 is provided with a model conditioning room located under the test section of the wind tunnel. After a test run, the operators move the model and its support from the test section into the conditioning room. A horizontal sliding door separates the conditioning room from the wind tunnel. When changes have to be made on the model, the model is warmed to ambient temperature by hot nitrogen. Dry air is introduced into the room prior to entry of the operators. Also this known system requires a large amount of energy for the warming and subsequent cooling of the model.

From AGARD Report No. 774 "Special Course on Advances in Cryogenic Wind Tunnel Technology", pp. 3-1 to 3-12, it is known to extend a channel from the side into the test section of the wind tunnel. This channel allows access to the model in the test section and is designed for human entry. This prior art requires that the model and the complete test section of the wind tunnel are warmed to ambient temperature before work can be carried out on the model.

OBJECT OF THE INVENTION

It is an object of the invention to provide a handling room for wind-tunnel cryogenic models which allows work to be performed on cold models and which reduces the energy demand required for keeping the model at a cold temperature.

SUMMARY OF THE INVENTION

As provided by the invention, the handling room for cryogenic models comprises an open-topped insulating box for accommodating the cryogenic model. The model can be introduced into the insulating box from above. Within the insulating box, a deep temperature is maintained by injection of cold air, while the working chamber surrounding the insulating box is supplied with warmed-up dry air. The cryogenic model can be placed into the insulating chamber from above and be maintained under cold conditions therein. The cold air contained in the insulating box remains trapped in it under the influence of gravity while the region of the working chamber surrounding the insulating box is kept at a higher temperature level by use of dried warm air. The introduction of dried warm air into the working chamber precludes the generation of condensation water on the model or in the insulating box. The dew point of the supplied warm air lies substantially in the range of the cold gas temperature within the insulating chamber.

A cryogenic model installed in the insulating box can be cooled down therein to the level of wind tunnel temperature or, if the model has already been in the wind tunnel, be maintained at the wind tunnel temperature. The personnel entrusted with the work to be performed on the model can stay in the working chamber without having to wear highly bothersome heat protective clothing; they will only need hand-gloves and breathing masks. The insulating box can be manually accessed from above for handling the cryogenic model. The personnel can enter and leave the working chamber through a door without being exposed to noteworthy changes in temperature. Due to the relatively small dimensions of the insulating box, the energy demand required for keeping the cryogenic model cold is low. The volume of the working chamber can be conceived of as a dry air barrier separating the cold volume of the insulating box from the humid ambient air prevailing outside the working chamber. The persons present within the working chamber should wear breathing masks for protecting the cryogenic model from humidity depositing thereon. The supply of cold air into the insulating box should be set in such a manner that there always occurs a very slight overspill of cold air over the upper edges of the walls of the insulating box. The overspilling cold air mixes immediately with the warm air contained in the working chamber. This overspilling reliably prevents inflow of warm air into the insulating box. Under the influence of gravity, the cold air cannot rise up within the insulating box. It has been observed that the stability of the cold air in the insulating box is remarkably good. The thermal gradient between the cold gas in the insulating chamber and the ambient air above the insulating chamber is concentrated over a region of about 20 cm below the upper edge of the walls of the insulating box. Also the thermal interchange between the cold air in the insulating box and the warm air in the working chamber is very small.

Further, components which have to be attached to the model can be cooled down and stored under cold conditions within the insulating box.

Preferably, the insulating box comprises modular wall elements which are connected to each other in a manner allowing quick release. Therefore, the configuration of the insulating box can be selected individually depending to the shape and size of the cryogenic model to be conditioned, so that the volume of the insulating box is as small as possible in each case.

Further, the instant handling room allows for applying static loads on the models. Loading devices arranged below the bottom of the working chamber are connected, by steel wires or steel bars, to loading frames which can be mounted onto different models and are individually adapted to the respective use. Correspondingly, special wire or bar passages in the walls or the bottom of the insulating box will be fitted to each model. The passages for the steel wires or steel bars can be formed in the wall elements while these are in their disassembled condition.

To illustrate the ranges of the temperatures involved, it should be noted that, during handling, the temperature in the working chamber can be changed within the range of 300 to 223K and the temperature in the insulating box can be changed within the range of 300 to 100K. The air pressure in the working chamber should be slightly higher than the atmospheric pressure for thus avoiding intrusion of atmospheric air into the working chamber. The overpressure typically is between 50 Pa and 400 Pa.

BRIEF DESCRIPTION OF THE DRAWINGS

An embodiment of the invention will be explained in greater detail hereunder with reference to the accompanying drawings.

DESCRIPTION OF THE PREFERRED EMBODIMENT

Figure 1:
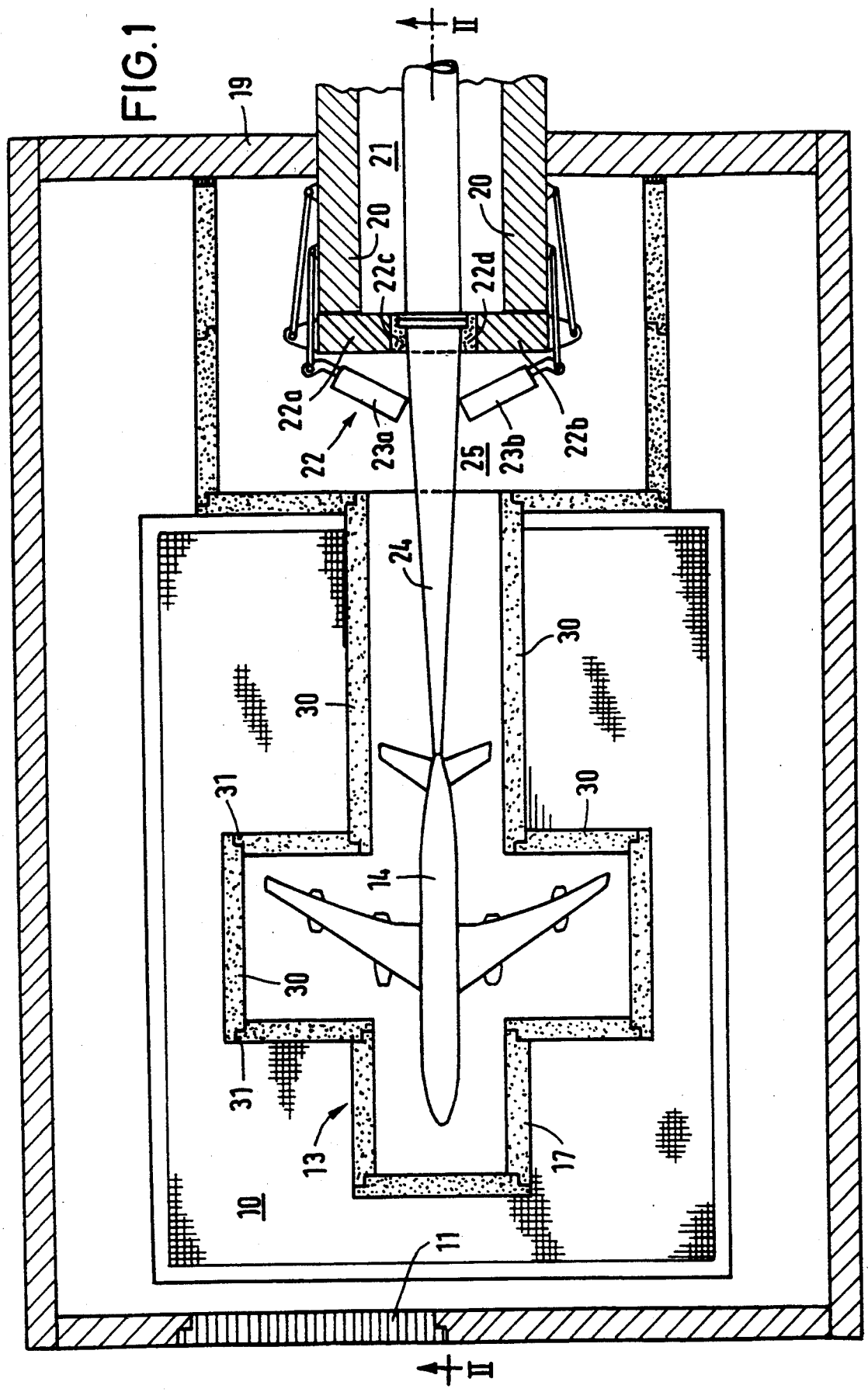
FIG. 1 is a plan view of the handling room.
Figure 2:
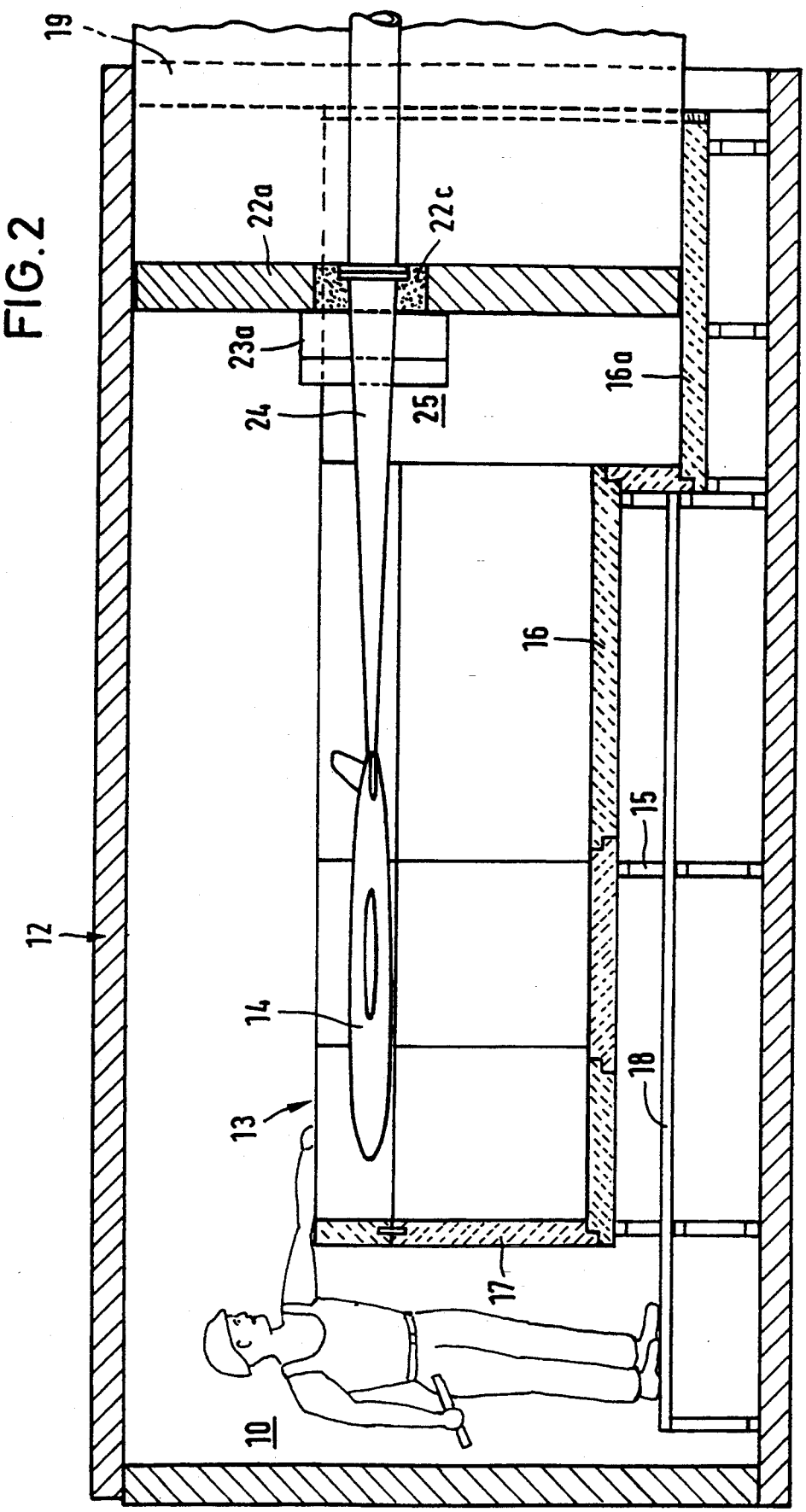
FIG. 2 is a sectional view taken along the line II—II of FIG. 1.

The handling room for cryogenic models comprises a working chamber 10 sealed in air-tight manner against the environment and being provided with a door 11 for human entry. Working chamber 10 has a movable top door 12 consisting of two horizontal wings 12a, 12b which extend over the complete length of the working chamber and can be moved apart for opening the working chamber in upward direction.

Within working chamber 10, there is located the insulating box 13 for accommodating the cryogenic model 14 to be tested. Insulating box 13, arranged on a rack 15 at a distance above the floor of working chamber 10, has a bottom wall 16 and side walls 17 projecting vertically therefrom. Insulating box 13 is open on its top side.

Outside insulating box 13, a working platform 18 is arranged within working chamber 10 at a distance above the floor of the working chamber. Cold air spilling out from insulating box 13 and sinking onto the floor of working chamber 10 does not touch the feet of the persons standing on working platform 18.

On one of its ends, insulating box 13 abuts a wall 19 of working chamber 10. Through an opening in wall 19, a channel 21 limited by walls 20 leads into insulating box 13. This channel 21, having an open top side, accommodates a longitudinal holder or sting 24 on which the cryogenic model 14 is mounted. Holder 24 can be fastened to a traveling crane adapted to vertically move the holder with the cryogenic model and to horizontally displace the holder with the model thereon to a remote position for placing the model into a wind tunnel. On the end of channel 21 facing towards insulating box 13, there is provided a door 22 having two wings 22a, 22b adapted to swing open into opposite directions. In its closed position, door 22 limits channel 21 and seals the end of insulating box 13 against the channel. The door wings 22a, 22b carry adapter blocks 22c, 22d which are made from an insulating material and each have a semicircular cut-out portion formed therein. The cut-out portions of the adapter blocks 22c and 22d enclose holder 24 when holder 24 is in a position for holding the cryogenic model 14 in place within insulating box 13. In the closed condition of door 22, holder 24 can be turned about its longitudinal axis for also turning cryogenic model 14 about its longitudinal axis.

The wings 22a, 22b are additionally provided with separately movable closing caps 23a and 23b for closing the insulating box 13 against channel 21 after removal of holder 24 along with model 14. When wings 22a and 22b have been closed and holder 24 is in position, the closing caps 23a and 23b are kept open by holder 24.

Channel 21 and its door 22 are located in a lock chamber 25 forming part of insulating box 13 and having its walls connected to the wall 19 of the working chamber. In the region of lock chamber 25, bottom 16a is arranged at a lower level than bottom 16 in the remaining area of the insulating box.

As best shown in FIG. 1, insulating box 13 consists of modular wall elements 30 which are connected to each other in a manner allowing easy release and which are assembled in modular fashion in such a manner that the plan-view configuration of insulating box 13 can be largely adapted to that of cryogenic model 14. The modular wall elements 30 have stepped vertical end edges 31 so that the end edges of two adjacent wall elements can be sealingly engaged with each other, allowing the formation of rectangular wall structures.

Each of the wall elements 30 has a thickness of about 10 cm. Each wall element includes an insulating central layer of a material which has a small thermal mass and is provided with a coating of aluminium or stainless steel on its outer sides.

For avoiding contamination of the dry air in the working chamber due to humidity or material particles becoming detached from the structural elements, all of the metal surfaces of the wall elements and of the other structures consist of uncoated aluminium or stainless steel. All of those materials which contain water have their outer sides provided with water barriers.

The wall elements 30 project up to a height of 1,10 m above the working platform 18 so that a person standing on working platform 18 can perform manipulations in insulating box 13 from above. Additional wall elements 30a, having a height of about 30 cm, can be mounted onto the wall elements 30 for enlarging the size of the insulating box to 1,40 m. The wall elements 30a are generally of the same structure as the wall elements 30.

Figure 3:
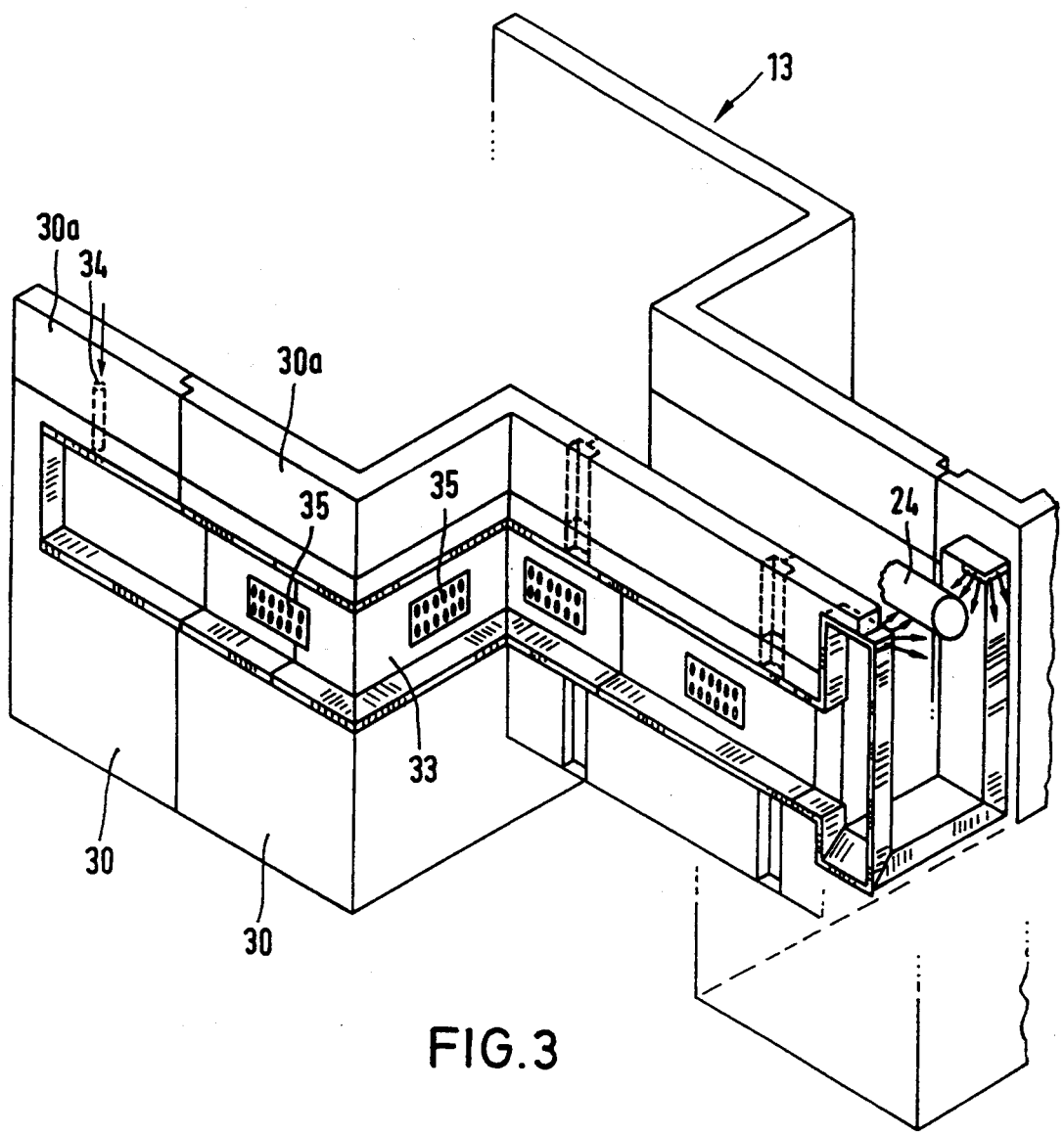
FIG. 3 is a perspective view of a part of the insulating box for illustrating the cold air supply system.
Figure 4:
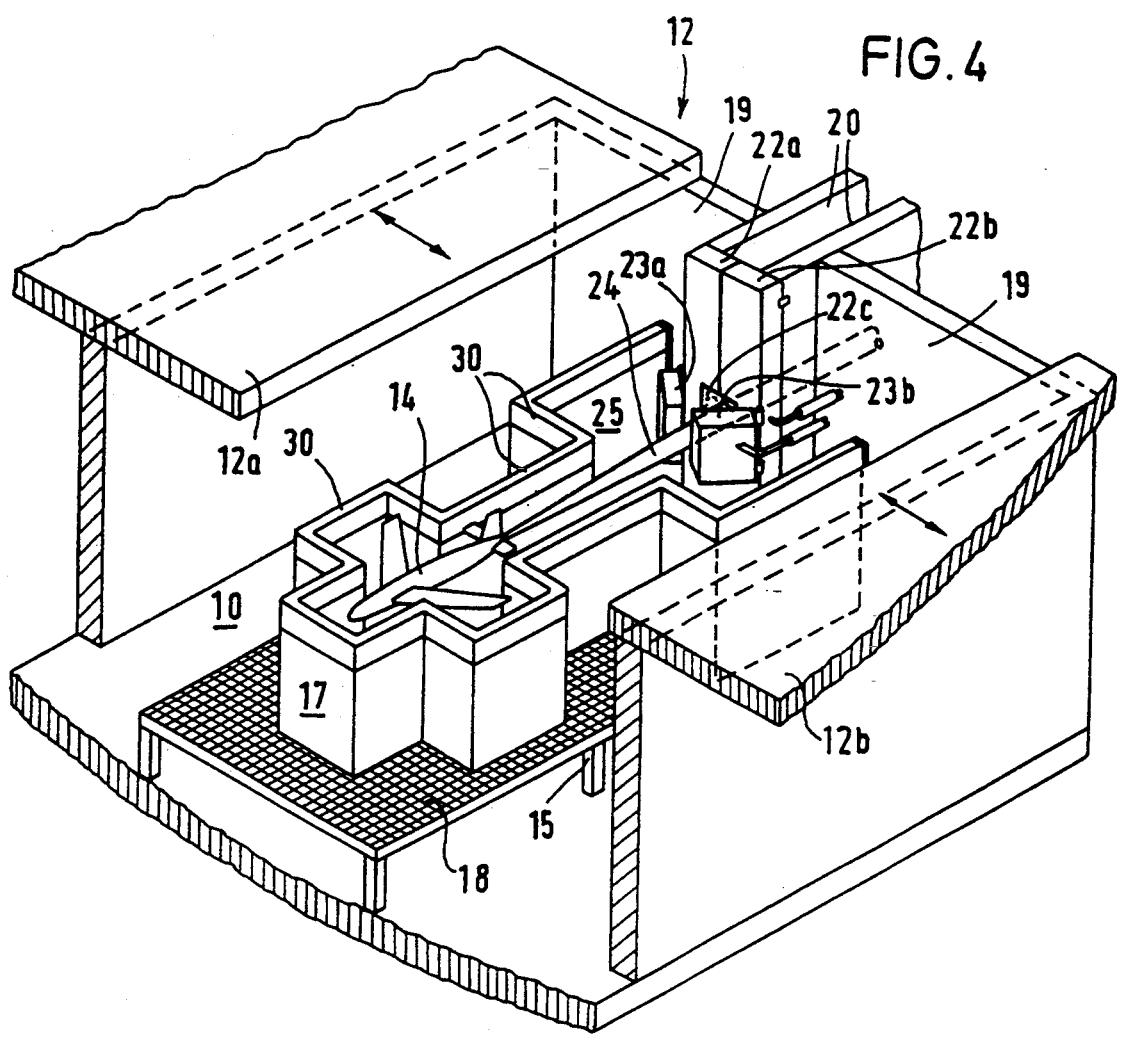
FIG. 4 is a perspective total view of the handling room.

The walls of insulating box 13 have cold air channels 33 formed therein (FIG. 3), extending within the wall elements 30. A cold air channel 33 is provided with an inlet 34 for injection of cold air. On the sides of cold air channel 33 facing towards the interior of insulating box 13, there are formed outlets 35 comprising perforated plates with sliding screens (not shown) whereby the cross sectional area of the passage can be changed for adjusting the quantity of cold air discharged by each outlet 35. Supply of the cold air to the cold air channel 33 is carried out at a rate which will cause just a very slight overspill of cold air over the upper edge of insulating box 13.

Figure 5:
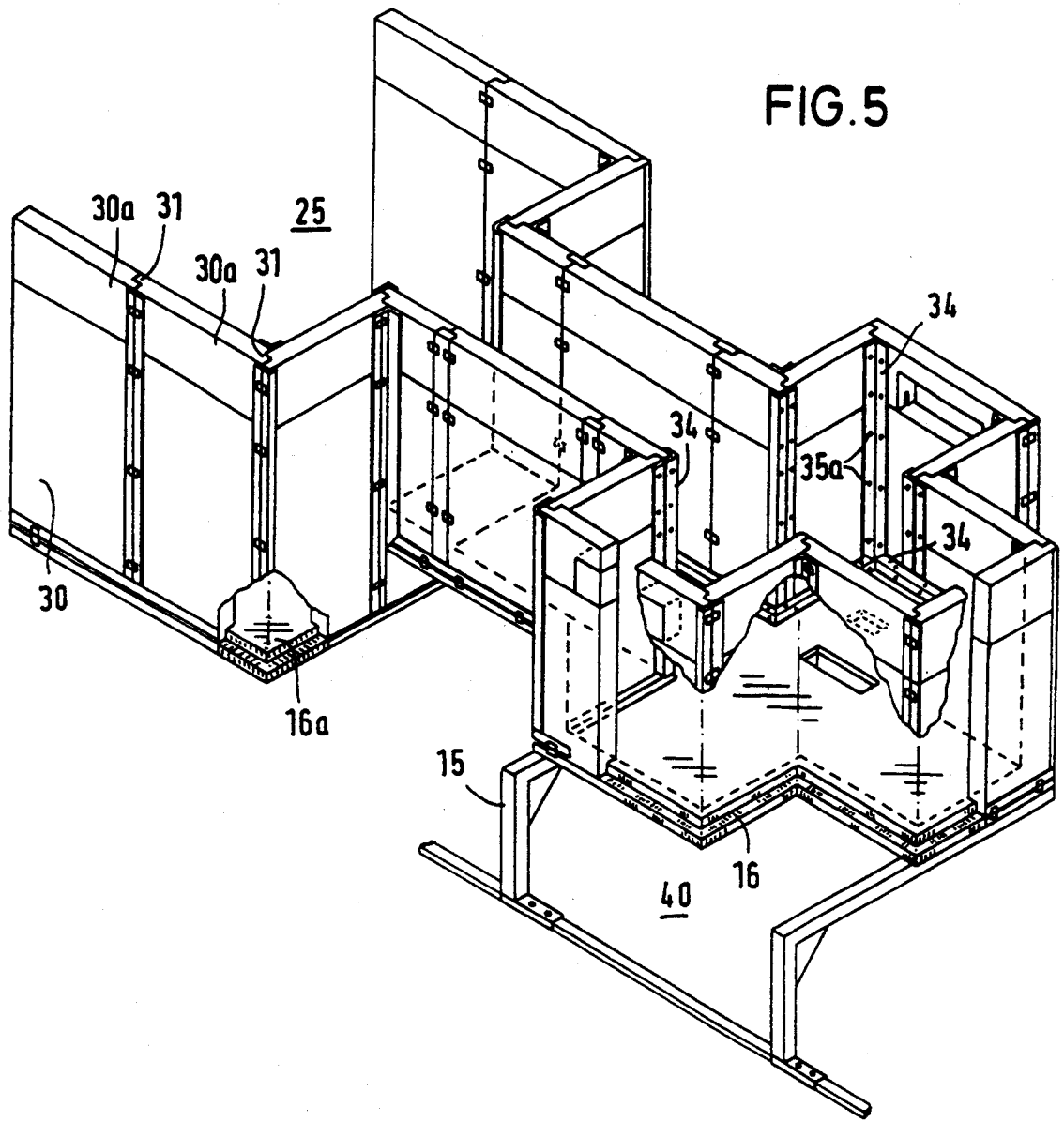
FIG. 5 is a perspective view of the modular structure of the insulating box.

FIG. 5 shows the general structure of the insulating box 13 with the wall elements 30 and 30a. Adjacent wall elements 30 are connected to each other and to the wall elements 30a by angular pieces 34 and are fastened by bolts 35a. Attachment of the upright wall elements 30 on bottom 16 is provided in such a manner that the tight abutment between wall elements 30 and bottom 16 will be maintained also in case of thermal changes of the length.

As further illustrated in FIG. 5, a space 40, allowing access to the model, is provided under the bottom 16 of insulating box 13. If required, supporting structures may be arranged on bottom 16 for support of the model within the insulating box.

For safeguarding that a person standing on the working platform will not contact the upper edge of the wall of insulating box 13 when reaching with his hands into the interior of the box, heat-insulating pads may be fastened on the upper edge of the insulating box 13.

We claim:

1. A handling room for a wind-tunnel cryogenic model, comprising:
   a closeable working chamber adapted to be heated by dried air, and
   an open-topped insulating box positioned in the working chamber and configured for receiving the wind-tunnel cryogenic model, the insulating box comprising heat-insulating material and defining a space adapted to be injected with cold gas.

2. The handling room of claim 1, wherein the insulating box comprises a plurality of walls, wherein the cryogenic model is carried by a holder, and comprising:
   a door provided in one of the plurality of walls, the door defining a closed condition enabling passage of the holder carrying the cryogenic model.

3. The handling room of claim 1, wherein the working chamber defines a bottom and comprising:
   a rack positioned in spaced relationship to the bottom of the working chamber for supporting the insulating box.

4. The handling room of claim 1, wherein the working chamber defines a bottom and comprising:
   a working platform provided outside the insulating box and positioned in spaced relationship to the bottom of the working chamber.

5. The handling room of claim 1, wherein the insulating box comprises a plurality of releasable modular wall elements, the modular wall elements being arrangable in a plurality of different geometrical configurations.

6. The handling room of claim 1, wherein the insulating box comprises a plurality of walls having a height, and comprising:
   a plurality of wall elements provided for mounting onto the plurality of walls of the insulating box for increasing the height of the walls of the insulating box.

7. The handling room of claim 1, wherein the insulating box defines an upper edge, and comprising:
   heat-insulating pads provided for attachment on the upper edge of the insulating box.

8. A handling room for a wind-tunnel cryogenic model, comprising:
   a closeable working chamber adapted to be heated by dried air, and
   an open-topped insulating box positioned in the working chamber, the insulating box comprising heat-insulating material and defining a space adapted to be injected with cold gas, wherein the cryogenic model is carried by a holder and comprising:
   a movable top door provided in the working chamber above the insulating box, the movable top door enabling the holder carrying the cryogenic model to be lifted out of the working chamber.

9. A handling room for a wind-tunnel cryogenic model, comprising:
   a closeable working chamber adapted to be heated by dried air,
   an open-topped insulating box positioned in the working chamber and configured for receiving the wind-tunnel cryogenic model, the insulating box comprising heat-insulating material and defining a space adapted to be injected with cold gas, and
   a cold gas channel provided in a wall of the insulating box, the cold gas channel having an outlet leading into the insulating box.

10. A method for manipulating a wind-tunnel cryogenic model under cryogenic conditions, comprising:
    connecting the cryogenic model to a movable holder,
    providing a closable working chamber,
    providing, within the working chamber, an open-topped insulating box,
    introducing dried air into the working chamber and the insulating box,
    moving the holder connected to the cryogenic model into the insulating box, and
    manipulating the model contained in the insulating box through the open top of the insulating box.

* * * * *